Feb. 15, 1949.      E. E. FOSTER      2,461,595
RETRACTABLE LANDING GEAR
Filed Oct. 15, 1943      2 Sheets-Sheet 2
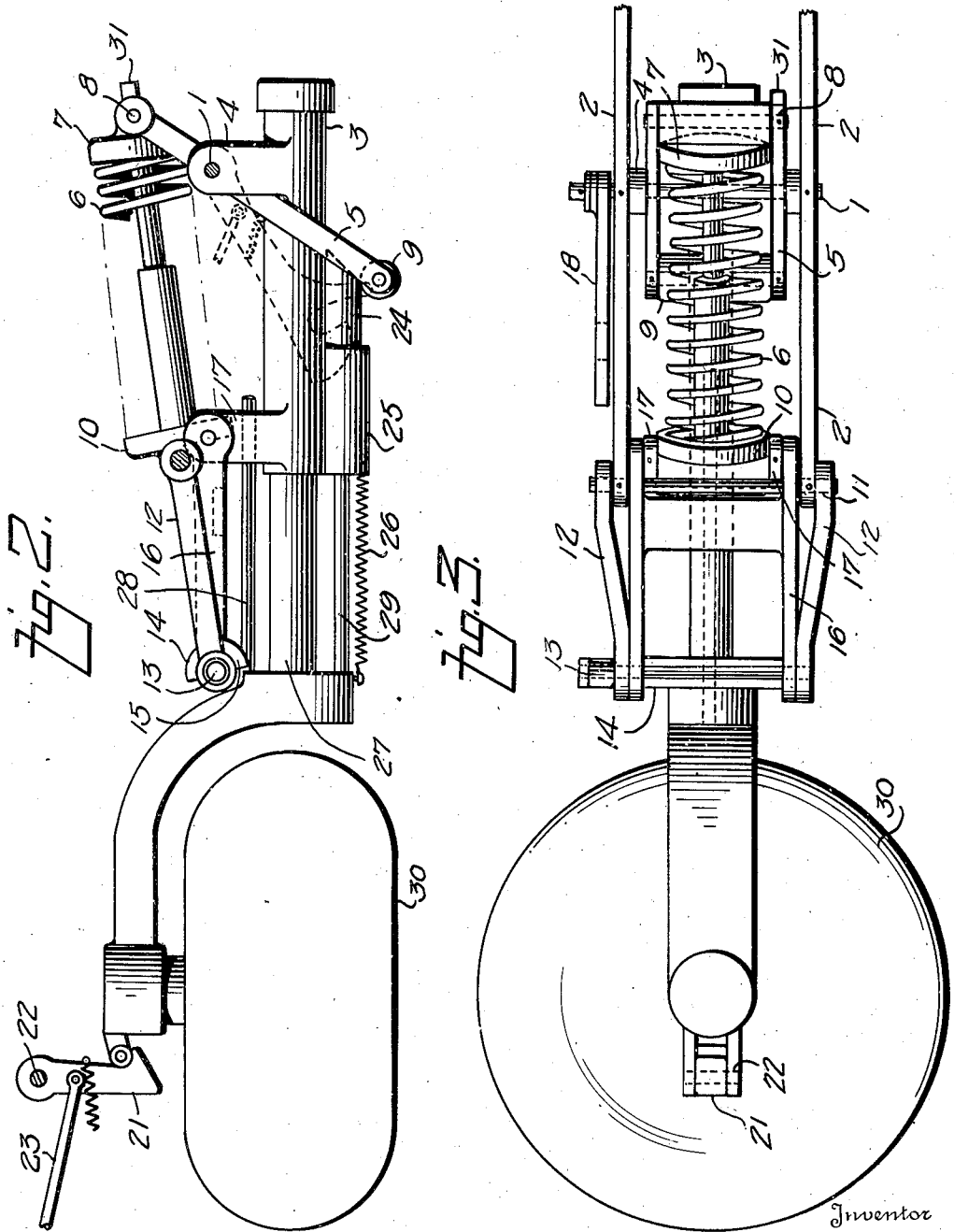
Inventor
EDWIN E. FOSTER
By Young, Emery & Thompson
Attorneys Patented Feb. 15, 1949

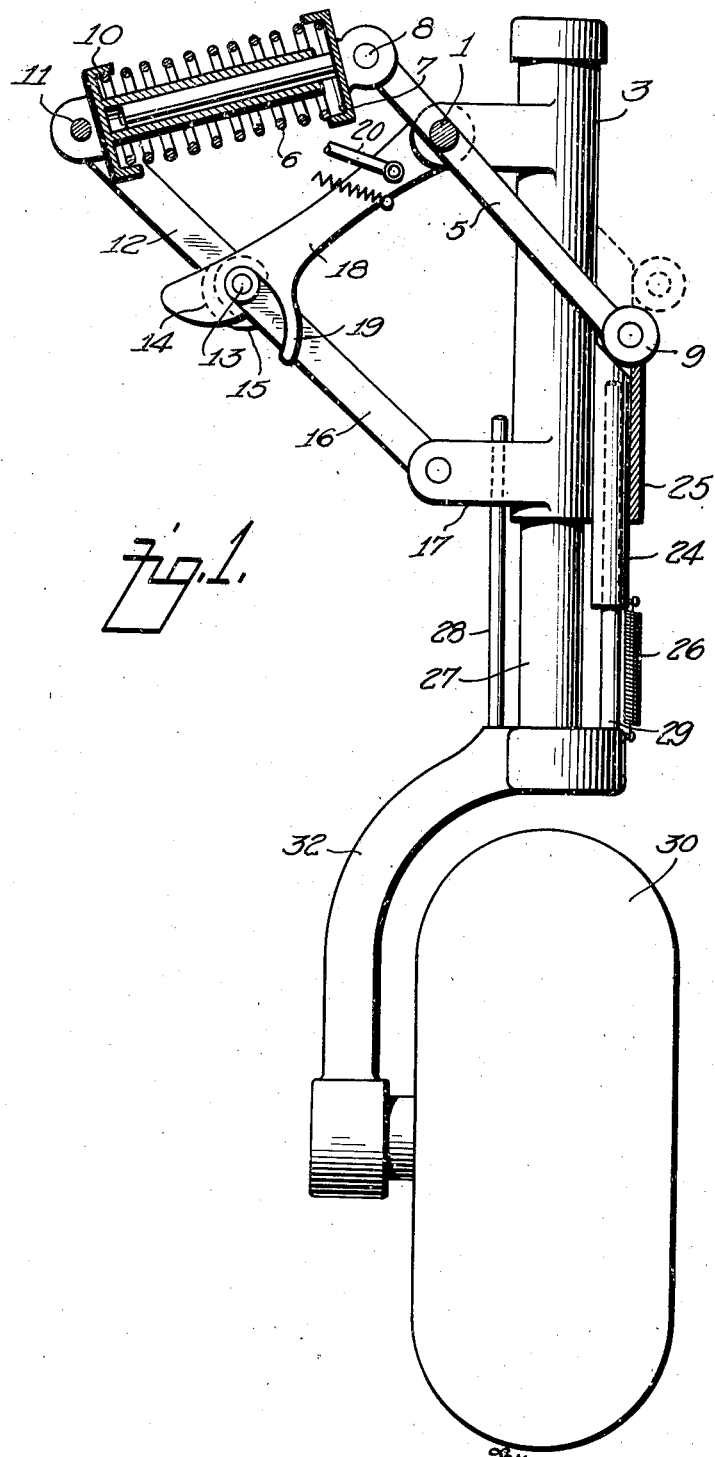

2,461,595

UNITED STATES PATENT OFFICE 2,461,595

RETRACTABLE LANDING GEAR

Edwin E. Foster, Austin, Tex.

Application October 15, 1943, Serial No. 506,405

14 Claims. (Cl. 244—102)

This invention relates to improvements in aircraft landing gears and particularly in such gears wherein a spring pulls the wheel of an aircraft into its retracted position.

It is an object of the invention to provide the wheel with means which will fold up the latter in ten seconds or less after the plane leaves the ground in order to reduce the "drag" effect. It is a further object of the invention to utilize a counterweighted or spring device instead of a hydraulic system requiring an accumulator to effect a quick retracting and lowering of the wheels of aircraft.

Another object of the invention is to utilize the energy of the landing shock or the weight of the plane in settling on the ground to restore the loss of energy in the spring due to mechanical friction, air friction, etc., and this energy at landing is utilized to provide the necessary surplus of energy that will be dissipated at each end of the stroke.

Further objects will be apparent from the following description when considered in connection with the accompanying drawings in which:

Figure 1 is an end elevation of an aicraft wheel and its gear showing the wheel in the down or extended position.

Figure 2 is a similar view with the wheel in the up or retracted position, and

Figure 3 is a plan view of Fig. 2.

The landing wheel 30 of any suitable construction is mounted on its gear and is supported and rotates upon retraction on a shaft or axle 1 which is preferably stationary. This shaft is mounted in a part of the aircraft such as the frame members 2, Fig. 3. Thus shaft 1 is the pivot axis for a large hydraulic cylinder or shock absorber 3 which is provided with two spaced arms or lugs 4.

The shaft 1 is also the pivot axis for a pair of lever arms 5 which support one end of a compression spring 6 by means of a cup 7 and a pin 8 on one end, and a roller 9 on the other end thereof. The other end of the compression spring 6 is provided with a cup 10 and a pivot pin 11 which latter is also a stationary shaft mounted in the frame 2. A pair of arms 12 are each pivoted at one end of the shaft 11 and the other ends of the arms are connected to a pin 13 to which a second pair of arms 16 are connected. Limit stops 14 and 15 are provided on the arms or prop stick 12 and 16 which will permit the prop stick or folding arm to stop on dead center position as shown in Fig. 1. The bottom end of the arms 16 are pivotally connected to lugs 17 on the cylinder 3. A latch member 18 is pivotally connected on the shaft 1 and is provided with a curved thumb portion 19 which forces the arms 12 and 16 off dead center position at pin 13 after being unlatched by means of a pull link 20. Another latch 21 is pivoted on a pin 22 on the frame 2 and is operated by means of a pull link 23.

A tapered wedge 24 is slidably arranged in guide tracks 25 secured on the side of the cylinder 3 and a return tension spring 26 is secured at one end to the wedge and the other end to a fork member 32 for the wheel. A smaller or lower cylinder 27 which carries a compression spring, not shown, for cushioning is provided with a guide rod 28 or a customary elbow link to prevent rotation of the cylinder. Another rod 29 secured in the fork member 32 moves with the lower cylinder 27 and moves or forces the wedge 24 against the roller 9 to further load the spring 6 at the time the weight of the plane, upon landing, is taken up by the wheel 30. The dotted line position of the wedge 24 and roller 9, Fig. 1, shows the roller upon the outer flat portion of the wedge. As the plane takes off, the wedge remains in the dotted line position due to the pressure against it and the plunger 29 will move downward away from the wedge.

When, however, the plane is in the air and the pull link 20 is operated to unlatch the arms 12 and 16 and push it off of dead center at 13, the spring 6 will throw or rotate the wheel 30 and the other parts into the position shown in Fig. 2 around the shaft 1, where it is caught by the latch 21. The pressure is now off of the roller 9 and the spring 26 will then pull the wedge 24 back to the position shown in Fig. 1 in relation to the cylinder 3.

When the latch 21 is released, the weight of the wheel 30 causes the parts to fall rapidly through the first part of the stroke and then be checked by the spring 6 as they come to rest in the position shown in Fig. 1 where the mechanism is latched again by the latch 18 and thus the wheel is in position for landing. The landing operation restores the loss of energy due to mechanical friction and air friction and provides the necessary surplus of energy that will be dissipated at each end of the stroke. A limit stop 31 on the frame 2 is provided to stop the travel of the arms 5 so that, in the position shown in Fig. 2, it will be assured that the wedge 24 will have the roller 9 completed off of its surface so that the spring 26 will retract the wedge 24. While it is not specifically shown, the customary electrical indicators may be provided to indicate when the wedge has been retracted, or mechanical means provided to prevent the unlatching of latch 21 unless the wedge is in the retracted position. In the latter case a third button or lever can be provided to positively retract the wedge in case it were to stick due to failure of spring 26.

The operation of the landing gear is summarized as follows:

Assuming that the elements are in the position shown in Fig. 1 in which the wheel has been permitted to be moved or dropped from the retracted position of Fig. 2 and thus the wheel and the operating mechanism are in place to receive the weight of the aircraft. As the wheel begins to contact the ground, the weight of the plane gradually settles on the cylinders 3 and 27 which by telescoping action transmit the weight of the plane plus the shock of landing to the hydraulic fluid and/or springs in the cylinders. This results in a relative movement of the cylinders 3 and 27, that is, cylinder 27 moves up into cylinder 3 and as this action takes place rod 29 moves or forces the wedge 24 upwardly relative to cylinder 3. This will force the wedge to move under roller 9 to move the arms 5 counter-clockwise around the shaft 1 thereby further loading or compressing the spring 6. This further loading replaces the energy which is lost due to mechanical and air friction and which will be dissipated at each end of the stroke.

Upon take-off of the plane the pull link 20 is operated to move latch member 18 upwardly or clockwise, Fig. 1, and the curved thumb portion 19 will force the arms 12 and 16 off center at pin 13, that is, move these arms outwardly. Thus the spring 6 pushing against the shaft 1 will force the arms 12 and 16 to fold up as in Fig. 2 which will throw the wheel 30 upwardly until the latch 21 engages the fork member 32 to thus hold the wheel in the horizontal or folded up position. In the latter position the force of the spring 6 being now released from the roller 9 and the wedge 24 so that the latter will be pulled back by the spring 26. The parts are thus in a position to repeat the operation of lowering the wheel in position for landing the plane.

From the foregoing, it will be apparent that the spring 6 is loaded by the fall of the wheel and its parts so that when the wheel is to be retracted, the loaded spring will throw the wheel back to its folded-up position.

I claim as my invention:

1. A retractable landing gear for an aircraft wheel comprising a shaft secured on a part of the aircraft, a wheel supporting member mounted to rotate on the shaft, a pair of lever arms rotatably mounted on said shaft intermediate their ends and abutting at one end on the supporting member, a pair of arms pivotally connected to each other and one end pivotally connected to the supporting member and the other end to a fixed support, a compression spring connected at one end to the other ends of the lever arms and the other end to the pair of arms, and means for latching the second pair of arms in position to maintain the wheel supporting member in the "down" position of the wheel.

2. A retractable landing gear for an aircraft wheel comprising a shaft secured on a part of the aircraft, a wheel supporting member mounted to rotate on the shaft, a pair of lever arms rotatably mounted on said shaft intermediate their ends and abutting at one end on the supporting member, a pair of arms pivotally connected to each other and one end pivotally connected to the supporting member and the other end to a fixed support, a compression spring connected at one end to the other ends of the lever arms and the other end to the other ends of the pair of arms, means for latching the second-mentioned pair of arms in position to maintain the wheel supporting member in the "down" position of the wheel, and a second latch for securing the wheel and its supporting member in the retracted position.

3. A retractable landing gear according to claim 2, in which the first-mentioned latching means contacts the pair of arms at the pivotal connection of the two pairs of arms.

4. A retractable landing gear according to claim 2, in which the first-mentioned latching means contacts the pair of arms at the pivotal connection of the two pairs of arms, and in which the first-mentioned latching means is provided with a curved thumb portion to contact the pivotal connection of the arms to retract the wheel upon movement of said latching means.

5. A retractable landing gear for an aircraft wheel comprising a shaft secured on a part of the aircraft, a wheel supporting member mounted to rotate on the shaft, a pair of lever arms rotatably mounted on said shaft intermediate its ends and abutting at one end on the supporting member, a pair of arms pivotally connected to each other and one end pivotally connected to the supporting member and the other end to a fixed support, a compression spring connected at one end to the other ends of the lever arms and the other end to the pair of arms, means for latching the second-mentioned pair of arms in position to maintain the wheel supporting member in the "down" position of the wheel, a second latch for securing the wheel and its supporting member in the retracted position, and a wedge member slidably mounted in the wheel supporting member and cooperating with the lever arms at the abutting ends to tension the spring when the wheel contacts the ground to compensate for mechanical and air friction.

6. A retractable landing gear for an aircraft wheel comprising a pair of relatively movable members one of which is connected to the wheel and the other to the aircraft and both cooperating to absorb landing shocks, a spring connected to one of the members to force the wheel to its retracted position, and means connected to both members operative when the wheel touches the ground and relative movement of the members takes place to thereby restore the energy in the spring which was expended due to mechanical and air friction.

7. A retractable landing gear for an aircraft wheel comprising a pair of telescoping and relatively movable shock absorbing members of which one has the wheel connected thereto and the other is connected to the aircraft, a shaft connected to the aircraft and on which the other member is pivotally mounted, a pair of lever arms rotatably mounted on the shaft approximately intermediate the ends thereof and having one end of each in abutting contact with one of the members, a compression spring mounted between the other ends of the arms and a fixed support, and means secured to and movable with the member on which the wheel is mounted to rotate the pair of lever arms by the abutting ends thereof when the wheel contacts the ground and relative movement of the members takes place to thereby restore the energy in the spring which was expended due to mechanical and air friction.

8. A retractable landing gear according to claim 7, in which a plurality of arms and a latch member are provided connected to the fixed support and the other member to lock the wheel by its members in the "down" position.

9. A retractable landing gear for an aircraft wheel comprising a pair of telescoping and relatively movable shock absorbing members of which one has the wheel connected thereto and the other is connected to the aircraft, a shaft connected to the aircraft and on which the other member is pivotally mounted, a pair of lever arms rotatably mounted on the shaft approximately intermediate the ends thereof and having one end of each in abutting contact with one of the members, a compression spring mounted between the other ends of the arms and a fixed support, and means secured to and movable with the member on which the wheel is mounted to rotate the pair of lever arms by the abutting ends thereof when the wheel contacts the ground and relative movement of the members takes place to thereby restore the energy in the spring which was expended due to mechanical and air friction, said means including a tapered wedge movable with the member on which the wheel is mounted.

10. A retractable landing gear for an aircraft wheel comprising a pair of telescoping and relatively movable shock absorbing members of which one has the wheel connected thereto and the other is connected to the aircraft, a shaft connected to the aircraft and on which the other member is pivotally mounted, a pair of lever arms rotatably mounted on the shaft approximately intermediate the ends thereof and having one end of each in abutting contact with the other member, a plurality of arms connected at one end to the other member and the other end to a fixed support, a compression spring mounted between the other ends of the arms and the fixed support, means secured to and movable with the member on which the wheel is mounted to rotate the pair of lever arms by the abutting ends thereof when the wheel contacts the ground and relative movement of the members takes place to thereby restore the energy in the spring which was expended due to mechanical and air friction, and a latch member connected at one end to rotate on the shaft and the other end cooperating with the second-mentioned arms to lock the members with the wheel in the "down" position of the latter.

11. A retractable landing gear for an aircraft wheel comprising a pair of telescoping and relatively movable shock absorbing members of which one has the wheel connected thereto and the other is connected to the aircraft, a shaft connected to the aircraft and on which the other member is pivotally mounted, a pair of lever arms rotatably mounted on the shaft approximately intermediate the ends thereof and having one end of each in abutting contact with the other member, a plurality of arms connected at one end to the other member and the other end to a fixed support, a compression spring mounted between the other ends of the arms and the fixed support, means secured to and movable with the member on which the wheel is mounted to rotate the pair of lever arms by the abutting ends thereof when the wheel contacts the ground and relative movement of the members takes place to thereby restore the energy in the spring which was expended due to mechanical and air friction, said second-mentioned arms each comprising a pair of arms pivotally connected to each other, and a latch member connected at one end to rotate on the shaft and the other end cooperating with the second-mentioned arms at the pivotal connection of both arms to lock the members with the wheel in the "down" position of the latter.

12. A retractable landing gear for an aircraft wheel comprising a pair of telescoping and relatively movable shock absorbing members of which one has the wheel connected thereto and the other is connected to the aircraft, a shaft connected to the aircraft and on which the other member is pivotally mounted, a pair of lever arms rotatably mounted on the shaft approximately intermediate the ends thereof and having one end of each in abutting contact with the other member, a plurality of arms connected at one end to the other member and the other end to a fixed support, a compression spring mounted between the other ends of the arms and the fixed support, means secured to and movable with the member on which the wheel is mounted to rotate the pair of lever arms by the abutting ends thereof when the wheel contacts the ground and relative movement of the members takes place to thereby restore the energy in the spring which was expended due to mechanical and air friction, said second-mentioned arms each comprising a pair of arms pivotally connected to each other, and a latch member connected at one end to rotate on the shaft and the other end cooperating with the second-mentioned arms at the pivotal connection of both arms to lock the members with the wheel in the "down" position of the latter, said latch member having a curved thumb portion to contact the pivotal connection when the arms are rotated relative to each other.

13. A retractable landing gear for an aircraft wheel comprising a pair of relatively movable telescoping members one of which is provided with the wheel and the other is pivotally secured to the aircraft, said members absorbing landing shocks, a spring bearing at one end on the aircraft and the other end to the pivotally mounted member to retract the wheel, and means on the members operative when the wheel touches the ground and relative movement of the members takes place to restore the energy in the spring which was expended due to mechanical and air friction.

14. A retractable landing gear for an aircraft wheel comprising a pair of relatively movable members one of which is provided with the wheel and the other is pivotally secured to the aircraft, said members absorbing landing shocks, a spring connected at one end to the aircraft and the other end to the pivotally mounted member to retract the wheel, and means operative when the wheel touches the ground and relative movement of the members takes place to restore the energy in the spring which was expended due to mechanical and air friction.

EDWIN E. FOSTER.

REFERENCES CITED

The following references are of record in the file of this patent:

UNITED STATES PATENTS

| Number | Name | Date |
| --- | --- | --- |
| 2,138,030 | Giovannoli | Nov. 29, 1938 |
| 2,224,481 | Larague | Dec. 10, 1940 |
| 2,260,290 | Brie | Oct. 28, 1941 |

FOREIGN PATENTS

| Number | Country | Date |
| --- | --- | --- |
| 835,773 | France | Oct. 3, 1938 |
| 851,143 | France | Sept. 25, 1939 |